(12) United States Patent
Collon

(10) Patent No.: US 6,675,950 B1
(45) Date of Patent: Jan. 13, 2004

(54) CONVEYING DEVICE IN PARTICULAR FOR CATERING

(75) Inventor: Manoel Collon, Paris (FR)

(73) Assignee: Columbus, Paris (FR)

( * ) Notice: Subject to any disclaimer, the term of this patent is extended or adjusted under 35 U.S.C. 154(b) by 0 days.

(21) Appl. No.: 10/019,338

(22) PCT Filed: Jun. 30, 2000

(86) PCT No.: PCT/FR00/01858
§ 371 (c)(1),
(2), (4) Date: Apr. 12, 2002

(87) PCT Pub. No.: WO01/01825
PCT Pub. Date: Jan. 11, 2001

(30) Foreign Application Priority Data

Jul. 2, 1999 (FR) .............................. 99 08545

(51) Int. Cl.[7] .............................. B65G 25/00
(52) U.S. Cl. .................. 198/465.2; 198/800; 186/49
(58) Field of Search ............ 198/465.1, 465.2, 198/580, 797, 800; 186/37, 44, 49, 50

(56) References Cited

U.S. PATENT DOCUMENTS

| | | | | |
|---|---|---|---|---|
| 4,278,165 A | * | 7/1981 | Nielsen et al. | 198/800 X |
| 4,422,544 A | | 12/1983 | Alldredge | 198/838 |
| 4,509,637 A | * | 4/1985 | Browning | 198/465.2 |
| 4,765,440 A | * | 8/1988 | Tashman | 186/49 X |
| 4,787,496 A | * | 11/1988 | Prodel et al. | 198/465.2 X |
| 5,113,970 A | * | 5/1992 | Bavis | 198/797 X |

FOREIGN PATENT DOCUMENTS

| | | | |
|---|---|---|---|
| EP | 0 056 912 | 8/1982 | B65G/17/06 |
| WO | WO 98/23509 | 6/1998 | B65G/21/22 |
| WO | WO 99/27826 | 6/1999 | A47G/23/08 |

* cited by examiner

Primary Examiner—James R. Bidwell
(74) Attorney, Agent, or Firm—Cohen, Pontani, Lieberman & Pavane

(57) ABSTRACT

A conveying device includes a mount frame, a first guide mounted on the mount frame along a conveying circuit, several transport trolleys distributed along the conveying circuit, and a system for driving each of the transport trolleys comprising a second guide mounted on each of said transport trolleys and designed to co-operate with the first guide, a transmission connected to the transport trolleys. Advantageously, each of the transport trolleys includes a support having at least one useful face, advantageously intended for supporting at least a dish, and maintained in a substantially horizontal position. The invention is useful for fast catering service in a restaurant hall or the like.

31 Claims, 16 Drawing Sheets

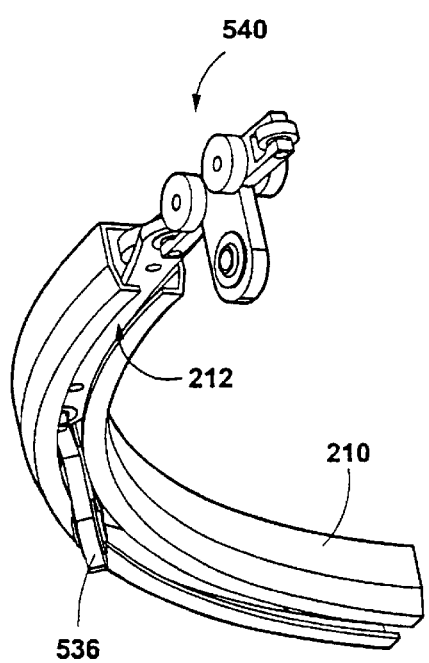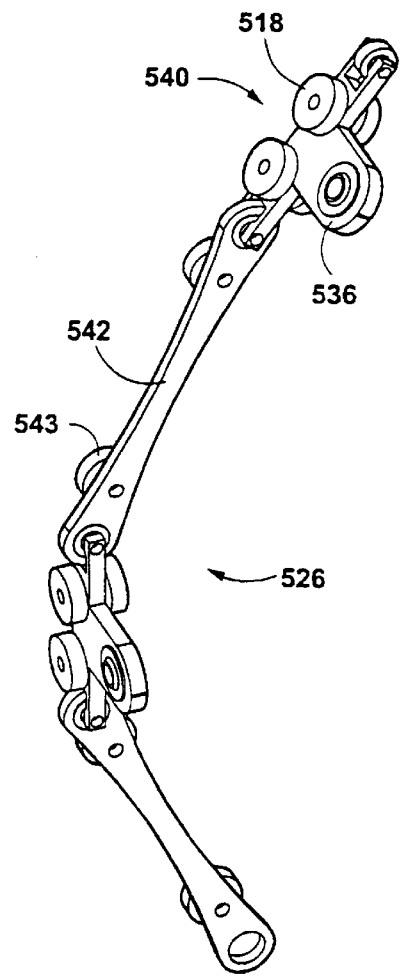
FIG.20
FIG.19

CONVEYING DEVICE IN PARTICULAR FOR CATERING

Conveying devices called "belt conveyors" and/or "pallet type conveyors" presenting an endless belt driven by drums and supported by rollers, are already known. Such belt conveyors are sometimes used in the domain of catering, particularly for restaurants of Japanese specialities, allowing the customers to see different categories of cold dishes pass near them, a customer being able to help him/herself immediately by grasping one of the dishes corresponding to the choice that he/she will have made visually.

One drawback of these known conveyors is that they do not allow transport and maintenance of temperature of dishes which have to be served at a temperature other than ambient temperature, in particular hot dishes which are necessarily included in the range of dishes proposed in traditional catering and which can in no case be served after a certain time after they have left the kitchen without possibly being reheated.

One of the other drawbacks of this type of catering is that the conveying by means of a belt does not necessarily constitute an environment as convivial and aesthetic as might be desired for a restaurant room. In addition, the use of a belt conveyor limits the possibilities of arrangement in the restaurant room, particularly as the possibilities of such a conveyor rising and/or descending are very limited and this type of belt conveyor cannot follow a very tight curve.

The present invention has for its principal object to provide a conveying device, in particular for catering, of the afore-mentioned type and which overcomes the drawbacks of the prior art in order to allow, simply and reliably, the transport of dishes along a conveying circuit that may present upward and downward slopes between two horizontal conveying zones, as well as relatively tight curves, while ensuring that the transported dishes are maintained in horizontal position.

According to the invention, this object is achieved in that the conveying device comprises a frame, first guiding means mounted on said frame along a conveying circuit, several transport trolleys distributed along said conveying circuit, and a system for driving each of the transport trolleys comprising second guiding means mounted on each of the transport trolleys and intended to cooperate with said first guiding means in order to guide the movement of said transport trolleys along said conveying circuit, transmission means adapted to be connected to said transport trolleys and powering means actuating said transmission means so as to drive said transport trolleys with respect to said frame by cooperation between said second guiding means and said first guiding means, each of said transport trolleys comprising a support having at least one useful face, advantageously intended for supporting at least one dish and means for maintaining said useful face substantially horizontal.

It will be understood that, according to one of the essential aspects of the present invention, the transport trolleys may ensure individual transport of different dishes, guaranteeing their horizontality, each trolley being able to be replaced or moved independently of the others, this allowing a great flexibility of arrangement.

The connection between said transmission means and each of the transport trolleys is advantageously disengageable.

According to a non-limiting preferred configuration, said transmission means comprise a chain connecting said transport trolleys to one another, said powering means actuating said chain with respect to said first guiding means.

According to another non-limiting preferred configuration, said transport trolleys each comprise an upright or post awhich is connected to said chain and in that said support is connected to an upper end part of said upright.

According to an advantageous preferred arrangement, said means for ensuring that said useful face is maintained substantially horizontal comprise a pivoting connection of horizontal axis, between said upright and said chain, and a counterweight equipping a lower end part of said upright. In this way, the trolleys form, thanks to the counterweight placed opposite the upright with respect to the dish support, rocking levers mounted to pivot with respect to the chain which supports them, at the level of the pivoting connection. Thanks to this configuration, a re-equilibrium by gravity of the uprights bearing the dish supports is thus permanently ensured, the latter remaining horizontal in all circumstances.

In addition, it is advantageously provided that said upright of the transport trolleys present a vertical principal direction and in that said useful face is at least partially planar and substantially perpendicular to said vertical principal direction.

In that case, it will then be understood that all the weights inherent to the different elements constituting the trolley will, if the counterweight is sufficient, be aligned, this ensuring hold of the trolley in vertical equilibrium in simple and efficient manner.

In addition, according to an advantageous preferred arrangement, the first guiding means form a runway or traveling path, preferably closed, for said chain (endless if the runway is closed) and said second guiding means present rolling elements adapted to cooperate with the runway.

The principal advantage of this solution is to form a roller drive connection which avoids friction, i.e. noise and premature wear at the level of the drive system.

Advantageously, the runway comprises at least one guiding rail presenting horizontal sections, possibly placed at different heights and connected together by upwardly/downwardly inclined sections.

In this way, as will be seen hereinbelow, it is possible for the conveying circuit to define different zones placed at different heights (zones at conventional restaurant table height or zone at higher table height, constituting a bar . . . ) or to pass in rooms located at different levels (multi-floor restaurants) without affecting the horizontal position of the different dishes conveyed.

According to another characteristic of the present invention, said frame is provided with at least one horizontal plate adapted to constitute a table overhanging, on bordering it, at least one portion of one of said horizontal sections at a height such that said dish support lies at least at the level of said plate. In this way, the customer sitting at the table sees all the different dishes proposed by the restaurant passing in front of him/her, just above the table formed by the plate. These dishes pass successively in front of the potential consumer's eyes by transport along the conveying circuit, but without the customer having the displeasure of seeing all the drive system which is hidden, inter alia, by the table and the frame, only the supports and the dishes that they receive projecting above the level of this table.

According to another very advantageous characteristic of the present invention, at least one support is provided with temperature maintaining means adapted to keep hot or cold a dish placed on said useful face of the support for a certain duration. Said temperature maintaining means preferably comprise at least one heat accumulator provided with a surface adapted to be in contact with said dish.

In this way, the conveying device according to the present invention allows, with a simple and reliable structure, the displacement of several transport trolleys placed one behind the other along a more or less windy conveying circuit (upward/downward slopes, tight bends . . . ) while guaranteeing that the transported dishes are maintained at the adequate temperature, whether these dishes be hot, cold or at ambient temperature.

The invention will be more readily understood, and secondary characteristics and their advantages will appear in the course of the description of different forms of embodiment given hereinafter by way of example.

It is understood that the description and drawings are given only by way of indicative and non-limiting example.

Reference will be made to the accompanying drawings, in which:

FIGS. 17 to 22 are views representing other possible forms of embodiment of the chain belonging to the system for driving the conveying device according to the present invention.

Figure 1:
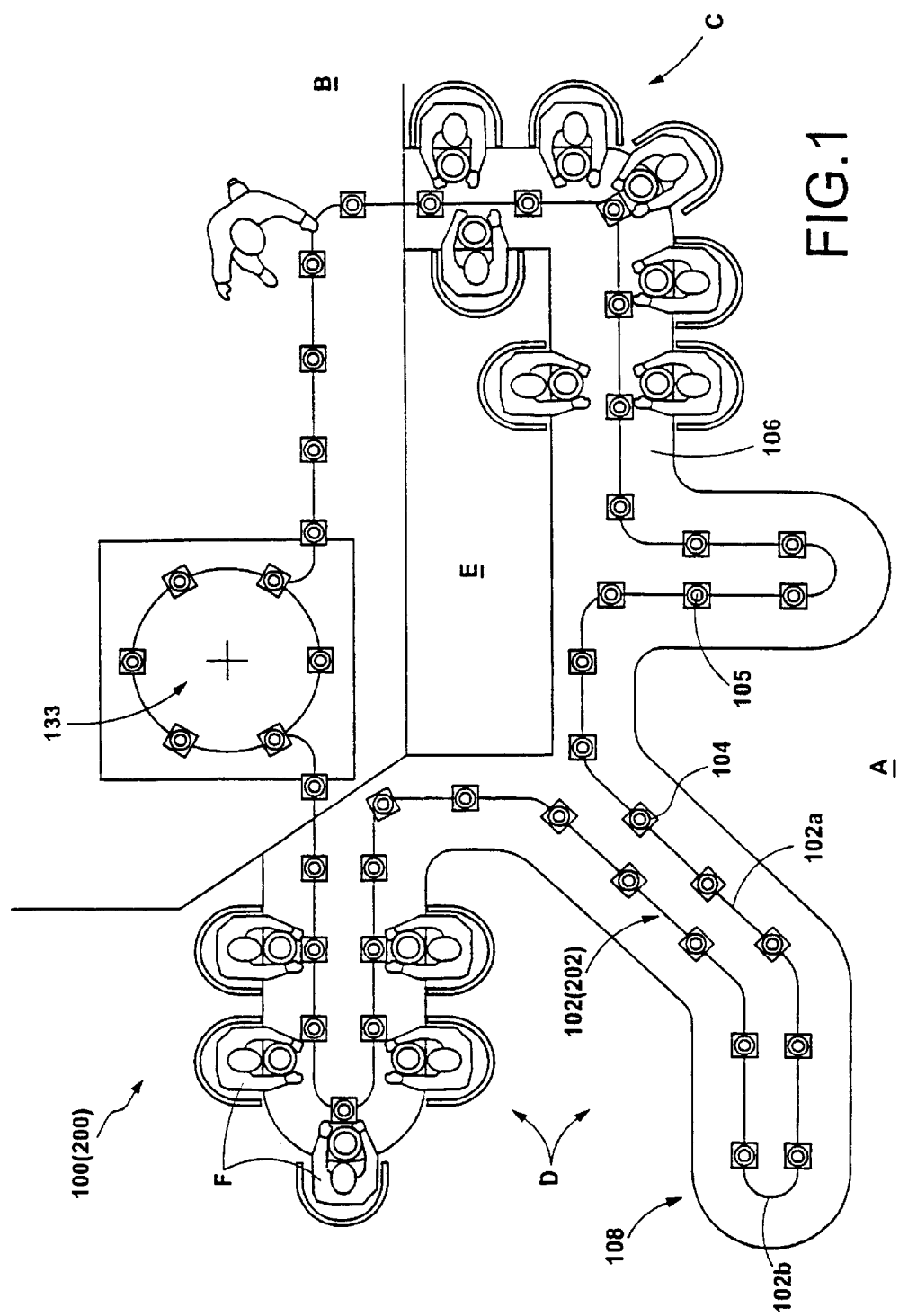
FIG. 1 is a diagram of an embodiment of a conveying device according to the invention, seen from above and defining a conveying circuit presenting one of the numerous possible paths.

FIG. 1 shows a form of embodiment of a conveying device 100 according to the present invention defining a conveying circuit 102 forming a path with rectilinear sections 102a and curved sections 102b in order to form a closed circuit.

This conveying circuit 102 alternately traverses a restaurant room A and a kitchen B. The restaurant room A is constituted by different zones: a bar zone C and different zones D each defining an island for a group of consumers distributed substantially in the same way as around a conventional restaurant table. In addition, an "animation" zone E is formed at the centre of the conveying circuit 102. Consumers may also sit in this zone E, as shown in FIG. 1, so as to sit facing the consumers sitting on the other side of the conveying circuit.

Thanks to the conveying device according to the present invention, it is possible to make these different zones thanks to the fact that the conveying circuit can follow upward and downward paths and relatively tight curves, as will be more readily understood hereinafter.

As may be seen in FIG. 1, transport trolleys 104 advance along the conveying circuit 102 in front of the customers F of the restaurant who may be sitting or standing along the conveying device in front of a table or a bar constituted by horizontal plates 106 forming the upper part of the frame 108 of the conveying device, these plates 106 being located at a height such that the dishes 105 borne by the trolley 104 project above these plates 106.

Figure 2:
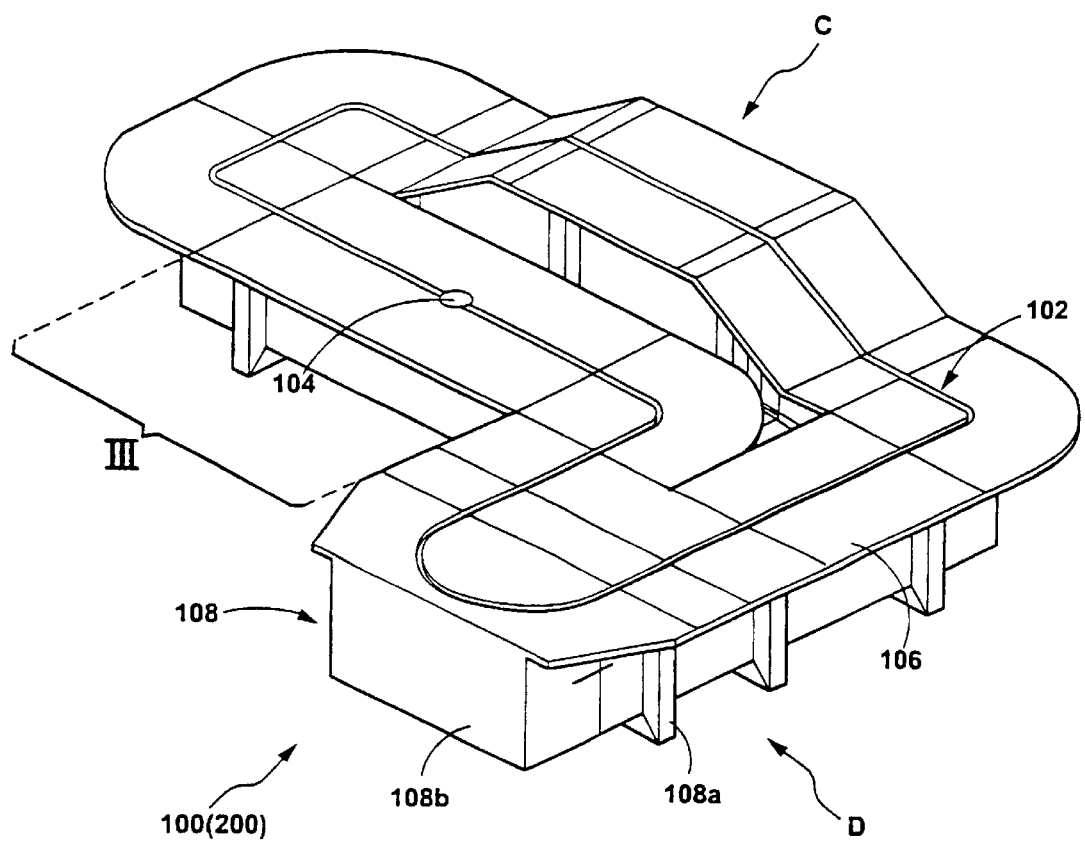
FIG. 2 is a diagram in perspective illustrating another possible path of the conveying circuit formed by the device according to the present invention.

FIG. 2 illustrates another possible path of the conveying circuit 102 of the conveying device 100 according to the present invention, showing again the frame 108 surmounted by horizontal plates 106 constituting tables of which certain lie at a higher level in order to constitute a bar C. In addition, a zone D corresponding to a group island is formed in a zone of the conveying circuit 102 presenting a relatively tight loop. In this loop, plates 106 are arranged outside the conveying circuit to form tables, on the one hand, and inside the loop that it forms at that spot to protect the client, preventing him/her from having access to the drive system, on the other hand.

For the purpose of reassuring and informing the customers as to the structure and reliability of the drive system, the frame 108 and/or the plates 106 may advantageously be provided to present transparent zones rendering part of the conveying device visible.

In this way, a conveying circuit 102 is obtained, presenting zones in a straight line, zones with curves presenting different radii and angles at the centre ranging from 0 to 270°, or even more, zones sloping upwardly and downwardly made by means of inclined plates in a rectilinear direction (cf. FIG. 2) or curved (case not shown).

In its visible part, the frame 108 presents supporting elements 108a preferably covered with a trim or casing 108b capable of concealing all the mechanical elements of the conveying device, at least in the zone of the restaurant room A.

A first form of embodiment of the conveying device is now illustrated in greater detail in connection with FIGS. 3 to 5.

Figure 3:
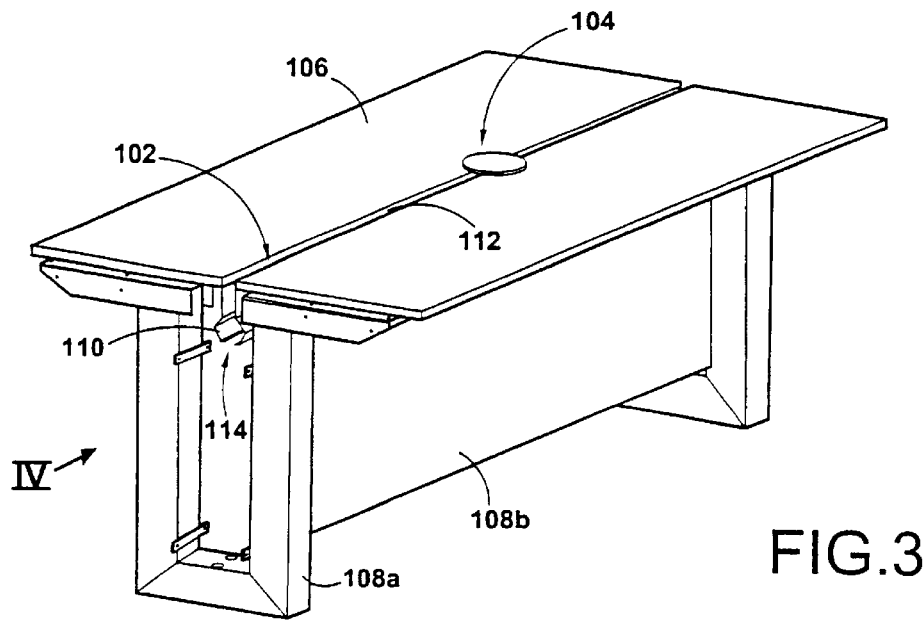
FIG. 3 is a detailed view in perspective of zone III of FIG. 2 for a first form of embodiment of the conveying device according to the invention.

As may be seen in FIG. 3 which illustrates a horizontal rectilinear section of the conveying circuit 102, the latter is defined between two plates 106 by two guiding rails 110 disposed on the frame 108 and separated by a longitudinal slot 112. These two guiding rails 110 are each made by means of a section open in the longitudinal direction, the two openings facing each other to form a runway 114.

Figure 4:
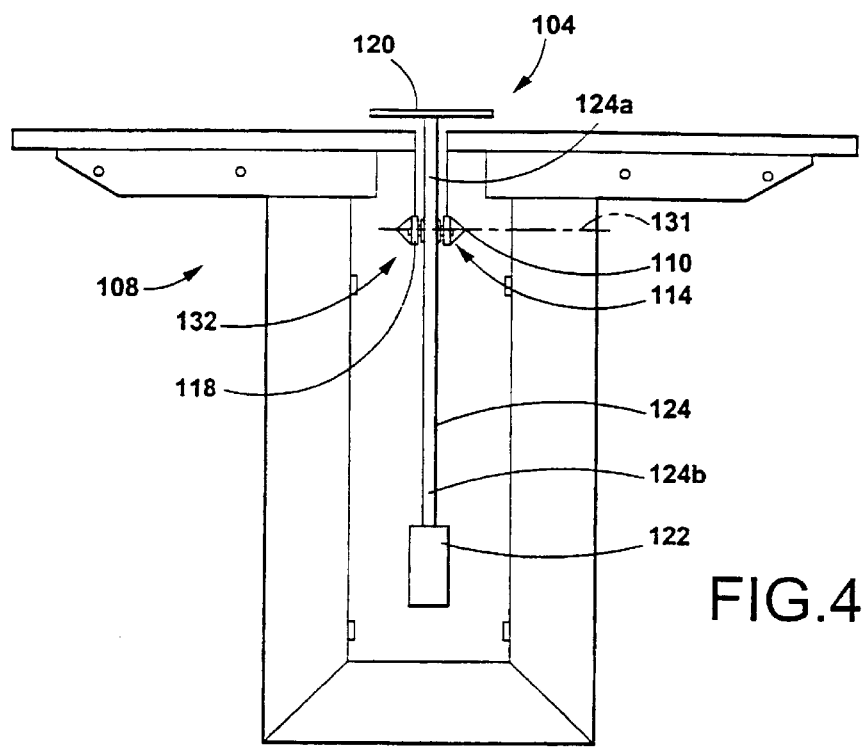
FIG. 4 is a view in elevation of FIG. 3 in the direction IV.

As shown in FIGS. 3 and 4, preferably, over the whole of the conveying circuit 102, that part of the horizontal sections of the guiding rail or rails 110 lying in the restaurant zone A is disposed beneath the two plates 106 adapted each to form a table. In this way, these tables are arranged on either side of a portion of conveying circuit 102, thus allowing two customers to sit facing each other, the conveying line 102 passing between the two customers.

The transport trolleys 104 generally comprise a support 120 and a counterweight 122 respectively mounted at the level of an upper end part 124a and a lower end part 124b of a rod forming an upright or post 124 presenting a vertical principal direction.

According to the first form of embodiment (cf. FIG. 5), the chain 126 connecting the transport trolleys 104 together is constituted by flexible belts 116 connected together by connection means provided with at least one roller 118 of horizontal axis perpendicular to said vertical principal direction of the upright 124 associated with said connection means. These rollers 118 may be made of plastics material or be formed by roller bearings, for example ball bearings. Said roller 118 is adapted to roll in a guiding rail 110 open on the side forming said runway 114, and said horizontal axis of the roller 118 is connected to the upright 124 to form a pivoting connection 132 allowing, at each instant, the re-equilibrium of the trolley 104, thanks to the counterweight 122, the trolley 104 thus forming a rocking lever.

The pivoting connection 132 and the counterweight 122 form means ensuring substantially horizontal hold of the support 120 and in particular of its useful face intended to bear a dish. This arrangement, although preferred, might be replaced by other means for ensuring horizontal hold of this useful face, particularly by using an additional rail parallel to the guiding rail 110 in an identical path. Such an additional guiding rail is located for example opposite the lower part of the upright 124 which is in that case equipped with at least one element intended to roll or to slide in this additional rail; in this way, a constant vertical orientation of the trolley 104 is also guaranteed.

Figure 5:
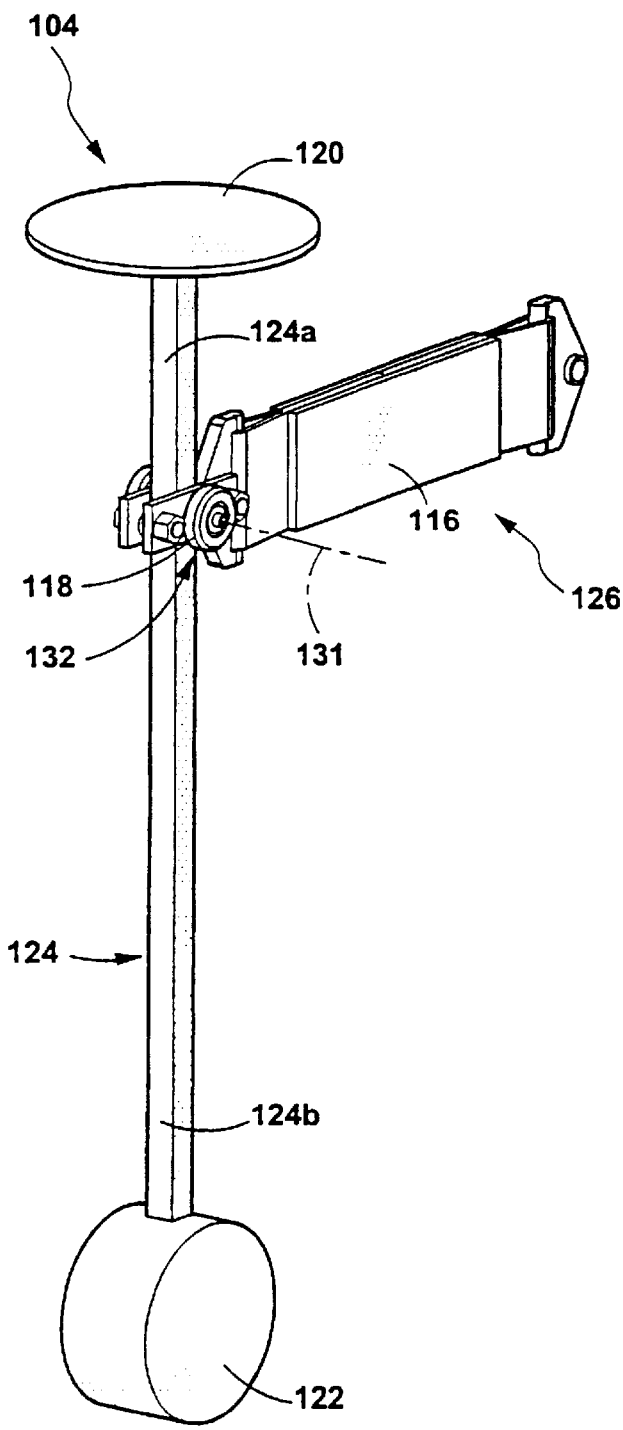
FIG. 5 is a view in perspective of a transport trolley mounted on a portion of the chain belonging to the system for driving the conveying device according to the first form of embodiment.

As may be seen in the example of FIGS. 4 and 5 of the first form of embodiment, the connection means comprise two rollers 118 of the same geometrical axis 131 which are mounted on either side of said upright 124, preferably above the centre of gravity of the trolley which supports, or not, a dish. The guiding means comprise two guiding rails 110 open on the side and placed opposite each other, the runway 114 being constituted, for each roller 118, by a longitudinal zone of the inner surface of one and the other, respectively, of said guiding rails 110.

For driving the chain 126 constituted by a succession of belts 116 connected together by the connection means located at the level of the pivoting connections 132, a powering module is placed at at least one place of the conveying circuit 102. As illustrated in FIG. 1, in the case of the first form of embodiment, this powering module may be constituted by a driving carrousel 133 constituted by a continually rotating, large-diameter wheel, the chain 126 being actuated by the contact with friction between the flexible belts 116 and the periphery of this driving wheel.

In the case of the form of embodiment illustrated, the geometrical axis 131 of the pivoting connection 132 is horizontal and perpendicular to the direction of the chain 126. However, it will be understood that this pivoting connection can present an axis which, while remaining horizontal, is disposed in another direction.

Similarly, in the case of the form of embodiment illustrated, the uprights 124 have been provided to present a vertical principal direction, with the result that the supports 120 present a useful face opposite the counterweight 122 essentially perpendicular to this vertical principal direction; nonetheless, the upright 124 may present other principal directions provided that the counterweight 122 allows, whatever the direction of the movement of the chain 126 (upward, downward or curved), the maintenance of the equilibrium of the trolley 104 to maintain substantially horizontal the useful face of the support 120 in order to avoid either the dish supported by this support 120 sliding or being tipped over, or the contents of this dish being spilt therefrom.

According to an essential arrangement of a second embodiment constituting a preferred form of the conveying device according to the present invention, each of the rolling elements constituting the chain 226 of the drive system comprises at least one roller 218, advantageously two rollers with the same geometrical axis of rotation, said rolling elements being adjacent and connected to one another to form said chain 226.

With reference to FIGS. 6 to 14 illustrating this second form of embodiment, certain elements are found which are identical or at least present the same function as certain of the elements of the first embodiment. In that case, the elements of this second embodiment present a reference number increased by a value 100 with respect to the reference number of the corresponding element of the first embodiment.

Figure 6:
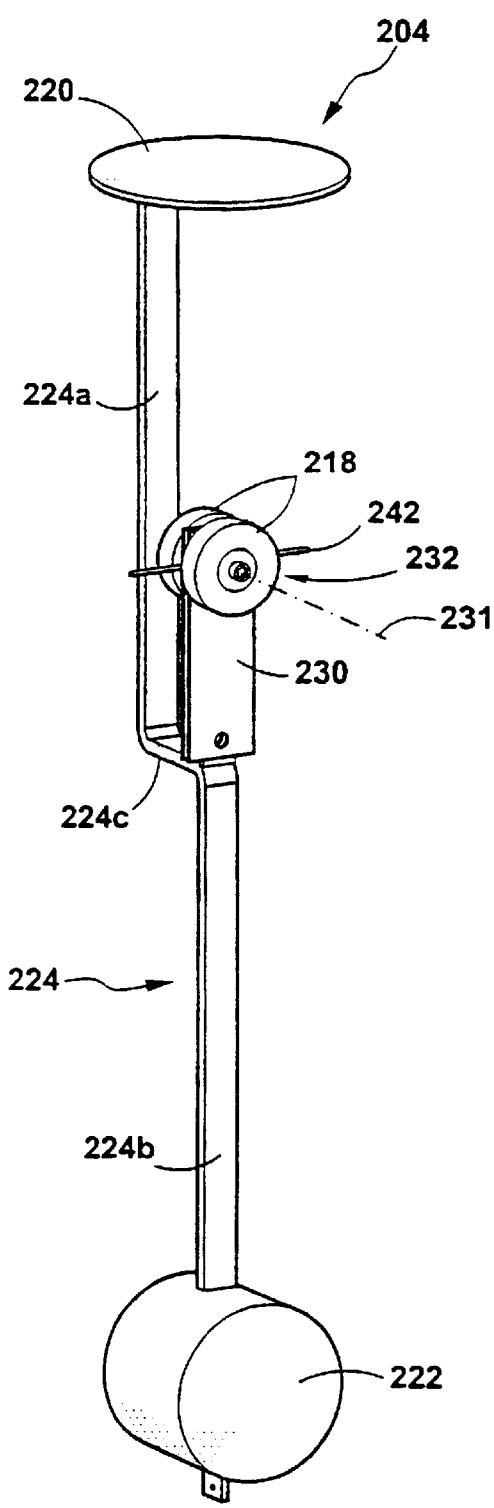
FIG. 6 is a view similar to that of FIG. 5 representing the transport trolley of a conveying device according to a second form of embodiment.

For example, in FIG. 6, apart from the upright 224, the support 220 and the counterweight 222, the transport trolley 204 comprises a connecting lug 236 upwardly extending the lower end part 224b of the upright 224, this lug being intended for fixing the transport trolley 204 on the chain as will be explained hereinafter, and a central horizontal connecting part 224c connting the upper and lower end parts 224a and 224b of the upright 224.

In this way, the upright 224 presents the form of a swan's neck since the lower and upper end parts are substantially parallel and offset. As may be schematically seen in FIG. 7, this configuration allows the upright 224 to go round the chain 226 and the guiding rail 210 associated therewith, so that the latter are hidden from sight of the customer F by the plate 206, on the one hand, and the support 220 bearing the dish 205 remains advantageously vertically aligned with the guiding rail 210 (runway 214) and the counterweight 222, the support 220 projecting above the plate 206 forming the table, on the other hand.

Figure 7:
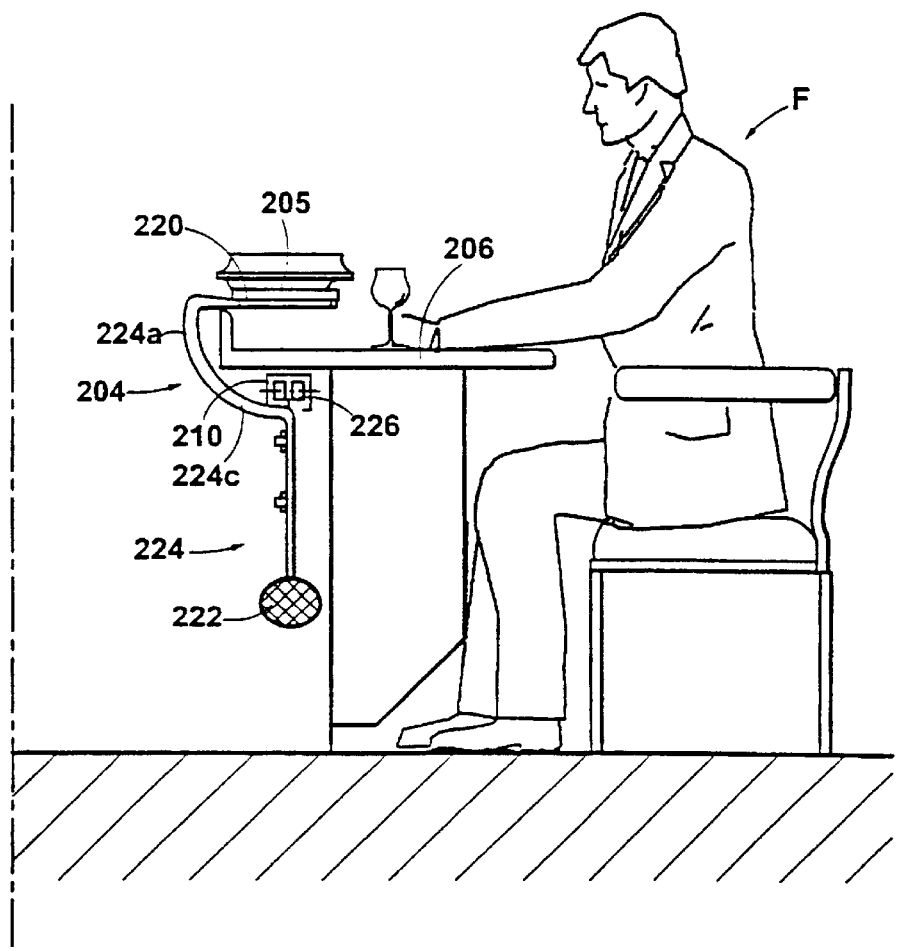
FIG. 7 is a schematic illustration representing the relative position between a guiding trolley according to a variant of the first and second embodiments of the conveying device according to the invention, and a part of the frame constituting a restaurant table.
Figure 8:
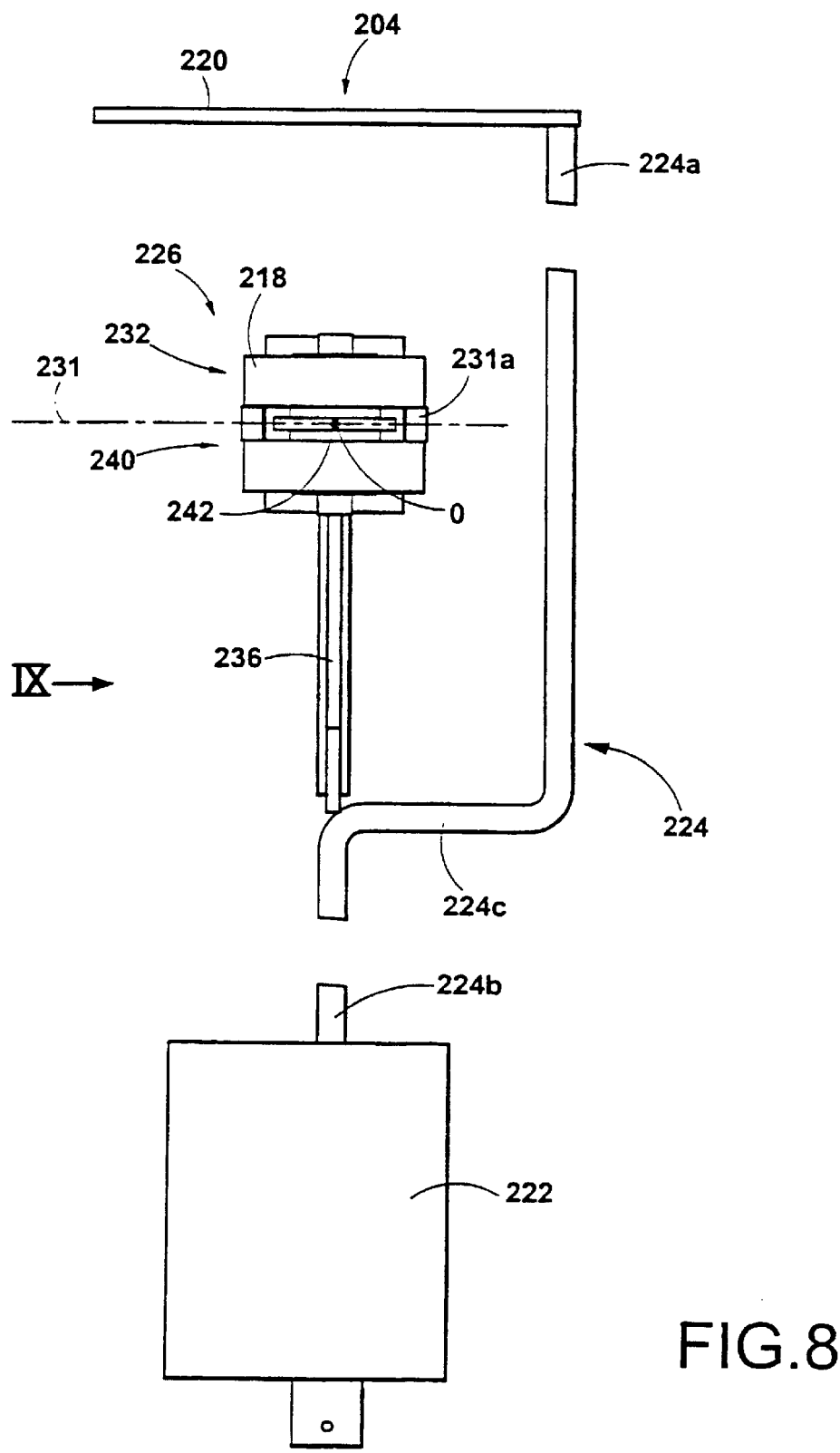
FIG. 8 is a partial view, in a plane transverse to the chain for driving the conveying device according to the second embodiment, representing a transport trolley and a part of the chain.

In this way, in order to achieve this result, the support 220 is preferably mounted on the upper end part 224a of the upright 224 by one of its edges (cf. FIGS. 7 and 8). The support 220 may be fixedly or removably mounted on the upright. This second possibility will be preferred as it offers the possibility of changing each of the supports 220 as desired without dismantling the trolley 204, for example thanks to an assembly by cooperation of shapes between the support 220 and the upper end part 224a of the upright 224, such as an assembly of the bayonet type.

It is also possible to make a disconnectable connection between the chain 226 and each of the transport trolleys 204: this would make it possible to choose at any moment the total number of trolleys present in the circuit as well as their relative position. Such a system would also make it possible to manage the fixation of the trolleys on the chain, for example in the kitchen. For example, this system comprises an articulated arm in rotation connected to the pair of rollers 218, the free end of this arm being provided with a guided jaw (particularly a spring-return clip) capable of closing on the chain (traction cable or other), being connected thereto, this operation being reversible by opening the jaw.

As illustrated in the variant embodiment of FIG. 7, the upright 224 may present an upper end part 224a and central part 224c forming an arc of circle; this swan's neck configuration also being applicable to the upright 120 of the first embodiment of the conveying device for the same purpose and with the same advantages.

As may be seen in FIGS. 8 to 15, the rolling elements 240 constituting the chain 226 are each composed of a pair of rollers 218 mounted to pivot about a material axial pin 231a forming a geometrical axis of rotation oriented perpendicularly to the longitudinal direction of the chain 226, alternately in a vertical and horizontal direction. These rolling elements 240 are connected together by a connecting cable 242, a belt or a cord, passing through the centre O of the rolling elements 240, through the material axial pins 231a to which the cable 242 is fixed; Each of the rolling elements 240 is spaced apart from its neighbour by a short distance, but avoiding any contact between two adjacent rolling elements 240 particularly in very tight curves.

This type of chain 226 has the particular advantage of being able easily to follow the shape of any path, upward, downward and in bends, without requiring high-power powering means.

In addition, the effort of traction of the chain 226 being exerted on the cable 242, it has no influence on the angular position of each upright 224 about its axis of rotation 231, whatever the direction of the section of cable bearing the upright 224 (rectilinear, curved, horizontal, upward or downward).

It will also be understood (cf. FIG. 8) that the geometrical axis 231 of the pivoting connection 232 and the vertical line passing through the centre of gravity of the trolley 204 converge at a point O forming the point of attachment of said trolley 204 on the chain 226. In this way, the geometrical axis 231 of the pivoting connection 232 and of the rollers 218, the weight of the counterweight 222 and the other elements of the trolley 204, as well as the effort of traction of the chain 226 which is exerted on the cable 242, converge at point O. Thus, the forces exerted on the chain 226 do not disturb the angular position (vertical) of the upright 224, on the one hand, and the forces applied on the upright 224 do not deform the chain 226, on the other hand.

Figure 9:
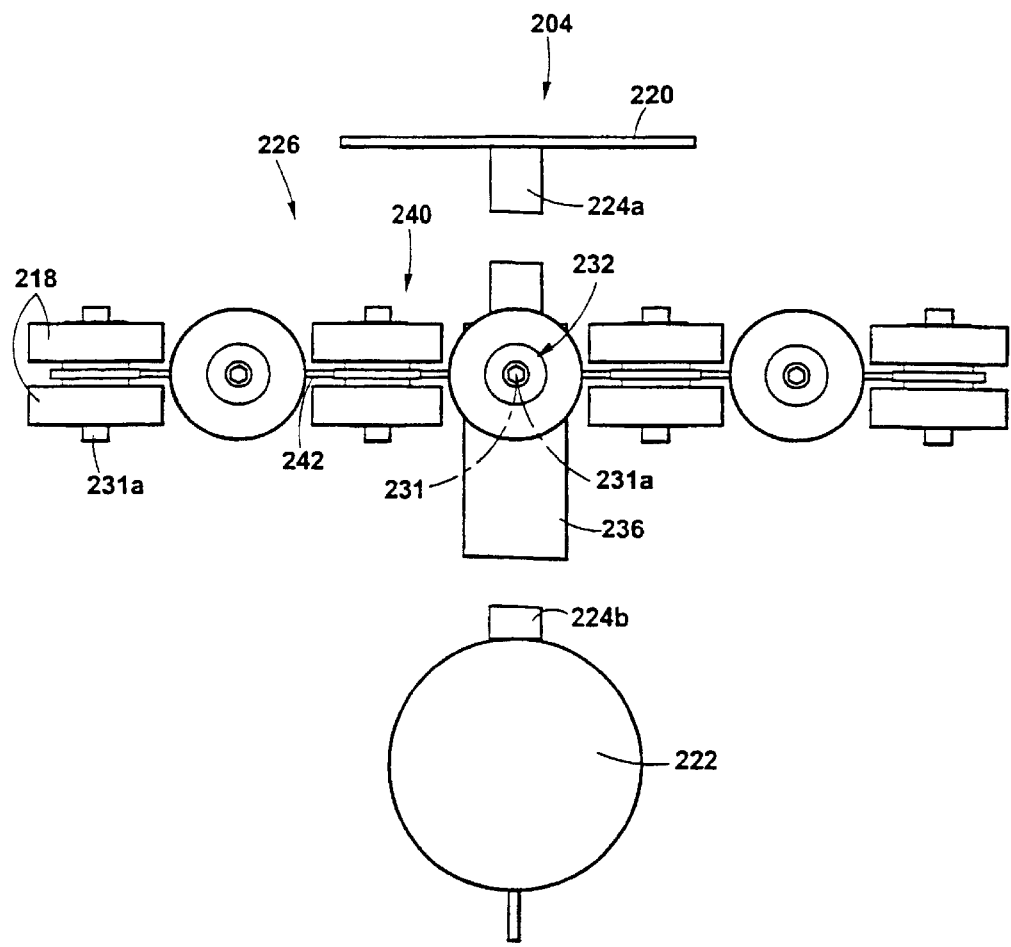
FIG. 9 is a view in elevation in the direction IX of FIG. 8.

For assembling the trolleys 204 on the chain 226, the connecting lugs 236 are provided to present, at the level of their upper end part, a bore 243 (cf. FIGS. 23 and 24) that the material axial pin 231a of a rolling element 240 traverses, this axial pin 231a having to present a horizontal direction in order to ensure the pivoting connection necessary for equilibrium of the upright 224 thanks to the counterweight 222 (cf. FIG. 9).

By way of example, the powering means allowing the actuation of this chain 226 may be constituted by at least one pair of parallel belts between which the chain 226 passes, with contact, with the result that all the rollers 218 of the chain 226 presenting an axis of rotation 231 of the same direction (either horizontal, or vertical) adhere on these belts, one of them being fixed and constituting a rolling surface, the other belt being constituted by an endless leading belt which, by the rolling drive of the rollers, allows the chain 226 to be actuated.

For controlling the conveying device 200, a switch, possibly coupled to a speed variator, makes it possible to control (stop/start function) a motor whose driven shaft allows the afore-mentioned leading belt to be driven in rotation.

As may be seen in FIGS. 10 to 14, the guiding rail 210 associated with the chain 226 preferably presents an inner section of substantially square shape of which the side presents a length slightly greater than the diameter of the rollers 218 each constituting rolling elements 240. In this way, the surfaces, parallel in two's, of the inner section of the guiding rail 210 constitute runways either for all the rolling elements 240 presenting a horizontal axis of rotation 231, or for all the rolling elements presenting a vertical axis of rotation 231.

Figure 10:
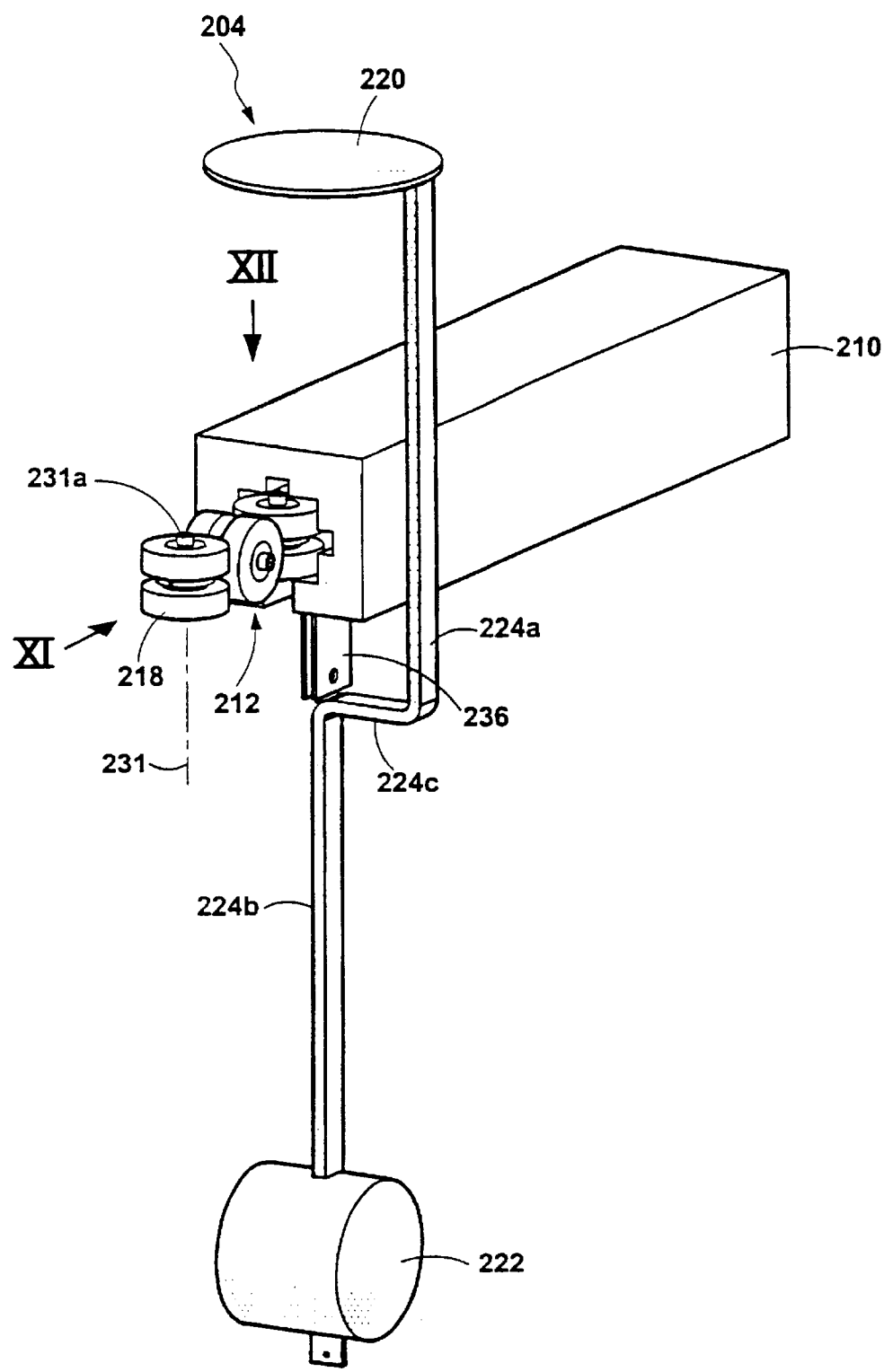
FIG. 10 is a view in perspective representing the trolley of FIG. 6 as well as the portion of the drive system to which this trolley is fixed, at the level of a horizontal rectilinear section of the conveying circuit.
Figure 11:
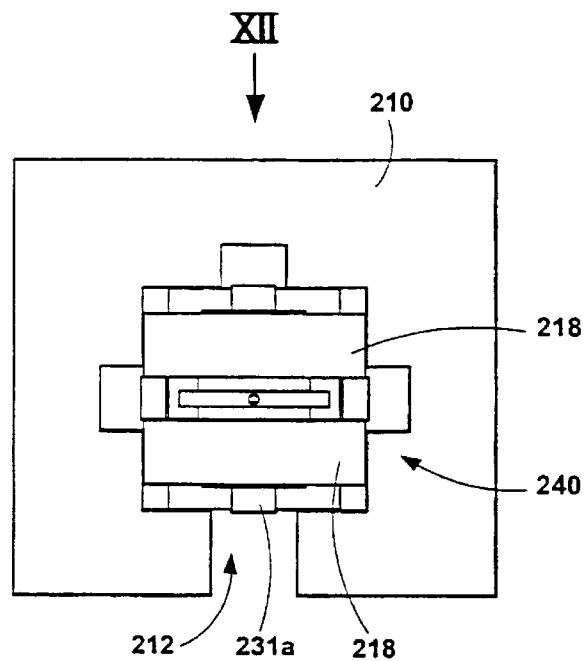
FIG. 11 is a view in elevation in the direction XI of FIG. 10 representing the system for driving the conveying device according to the second embodiment.
Figure 12:
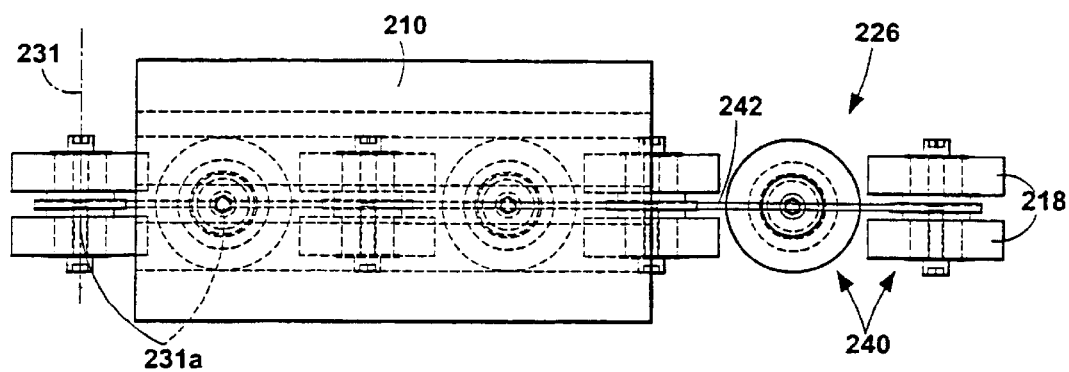
FIG. 12 is a partially transparent elevational view in the direction XI of FIGS. 10 and 11 representing the system for driving the conveying device according to the second embodiment.

FIGS. 10 to 12 refer to a rectilinear section of the guiding rail 210, which, as may be seen for example in FIG. 10, is open downwardly at the level of a longitudinal slot 212 allowing the passage without friction of the connecting lug 236 connecting each of the trolleys 204 to the chain 226. In this way, it is ensured that the uprights 224 are connected to a pair of, rollers 218 of horizontal axis of rotation 231 by means of the connecting lug 236 which upwardly extends the lower end part 224b of the upright 224, the connecting lug 236 penetrating in the slot 212, with the result that the central part 224c and the upper end part 224a of the upright 224 go round the guiding rail 210.

This form of rail 210 (closed on the top and open underneath) is particularly advantageous in that it protects the conveying circuit from any pollution from food or any other foreign body that might fall, from the zone overhanging the plates 106 serving as table, into the space 102 or 202 located between these plates 106. Such foreign bodies will in effect remain on the top of the rail but in no case come into contact with the chain 226 and risk disturbing the rolling thereof inside the rail 210.

In addition, this upturned U cross-section of the rail 210 reinforces the security of the conveying device of which the mobile parts are thus rendered inaccessible for the customer of the restaurant from the top of the plates 106 forming the tables, including from the afore-mentioned space.

As has already been explained hereinbefore, the upper end part 224a of the upright 222 is preferably connected, advantageously removably, in a peripheral zone of the support 220 so that this support 220 is aligned with the guiding rail 210 and the chain 226, on the one hand, and the counterweight 222, on the other hand.

Within the framework of the present invention, the positioning of the dish support in the lower part of the upright (suspended dish-holder not shown) should be envisaged, with the result that the guiding rails in that case lie above the level of the dishes. In this case, the dish support may perform the role of the counterweight which may then be lightened or even omitted.

Figure 14:
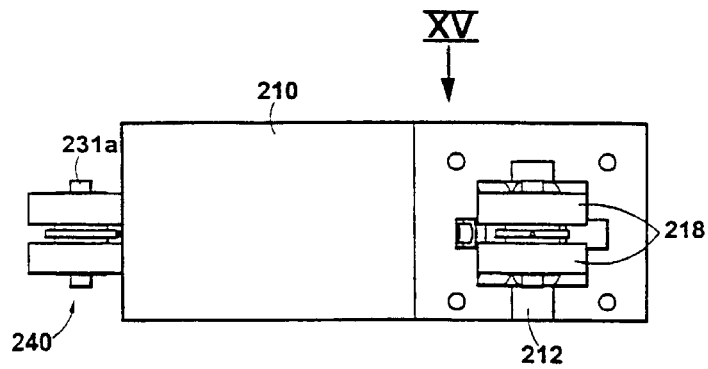
FIGS. 13 to 15 are views similar to FIGS. 10 to 12 in the case of a horizontal curved section of the conveying circuit.
Figure 13:
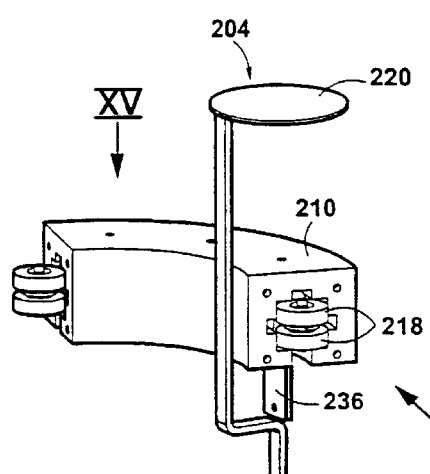
Figure 15:
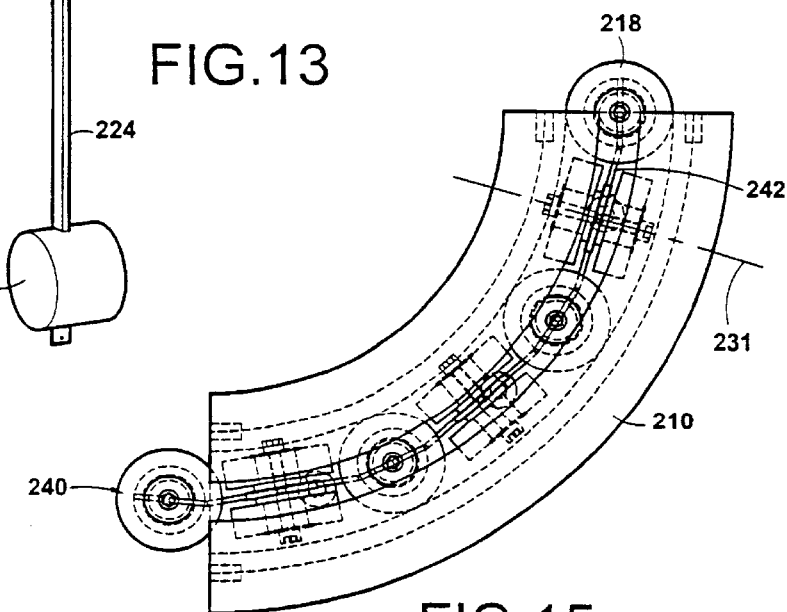

FIGS. 13 to 15 respectively show the same elements as FIGS. 10 to 12, being question of a section of horizontal guiding rail 210 which is curved.

Figure 16:
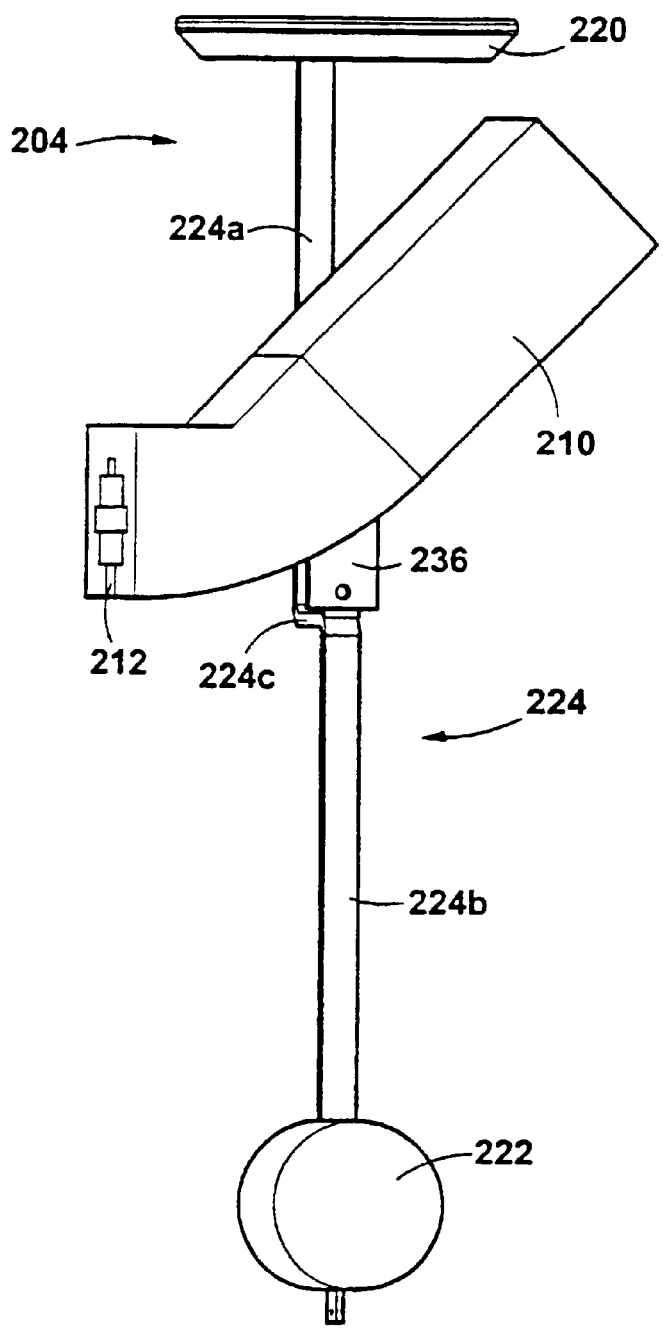
FIG. 16 is a view in perspective similar to that of FIG. 10 in the case of a rectilinear section of the conveying circuit inclined at 45°.

FIG. 16 corresponds to a view similar to that of FIG. 10 for a rectilinear rail section 210 inclined at 45° in an upward or downward slope: the upright 224 is maintained in vertical position thanks to the counterweight 222 allowing the trolley 204 to form a rocking lever. The support 220 capable of bearing at least one dish containing liquid or solid food (saucer, plate, bowl, dish, ramekin, glass . . . ) thus always remains horizontal.

The trolleys 204 may advantageously be connected to one another, preferably at the level or in the vicinity of the counterweights 222 by an additional cable (not shown), a belt or a cord, ensuring, especially when the trolleys are disposed very close to one another, a dampened rocking lever movement varying progressively between the adjacent trolleys. In effect, the uprights 224, the cable 242 and the additional cable form for each trolley 204 a deformable parallelogram. In this way, the action of several counterweights 222 can be accumulated on one trolley.

In addition, other technical solutions might replace those which have just been illustrated, in particular at the level of the drive system (chain 126 or 226) and the guiding means (rails 110 or 210) in order to allow the displacement of the drive system, to which are connected the transport trolleys 104 or 204, in cooperation with the guiding means, preferably by rolling, the dish supports 120 or 220 being maintained in horizontal position thanks to the possible rocking lever movement of the uprights 124 or 224 with respect to the drive system, said movement rendered possible by the presence of the afore-mentioned counterweights 122 or 222.

It can also be envisaged, without departing from the framework of the present invention, to provide instead of the chain and the powering means actuating this chain, a motorization inherent to each trolley, independent of the motorization of the other trolleys. Such a motorization may for example be constituted by an electric motor supplied by battery or D.C., an electromagnetic coil with respect to a metal rail, by air jet . . . It is thus understood that the system of slide by rails and rollers may be replaced by a system of magnetic field or air cushion.

For example, FIGS. 17 to 22 show other possible forms of embodiment of the chain and/or its connection with the trolley.

Figures 17, 18:
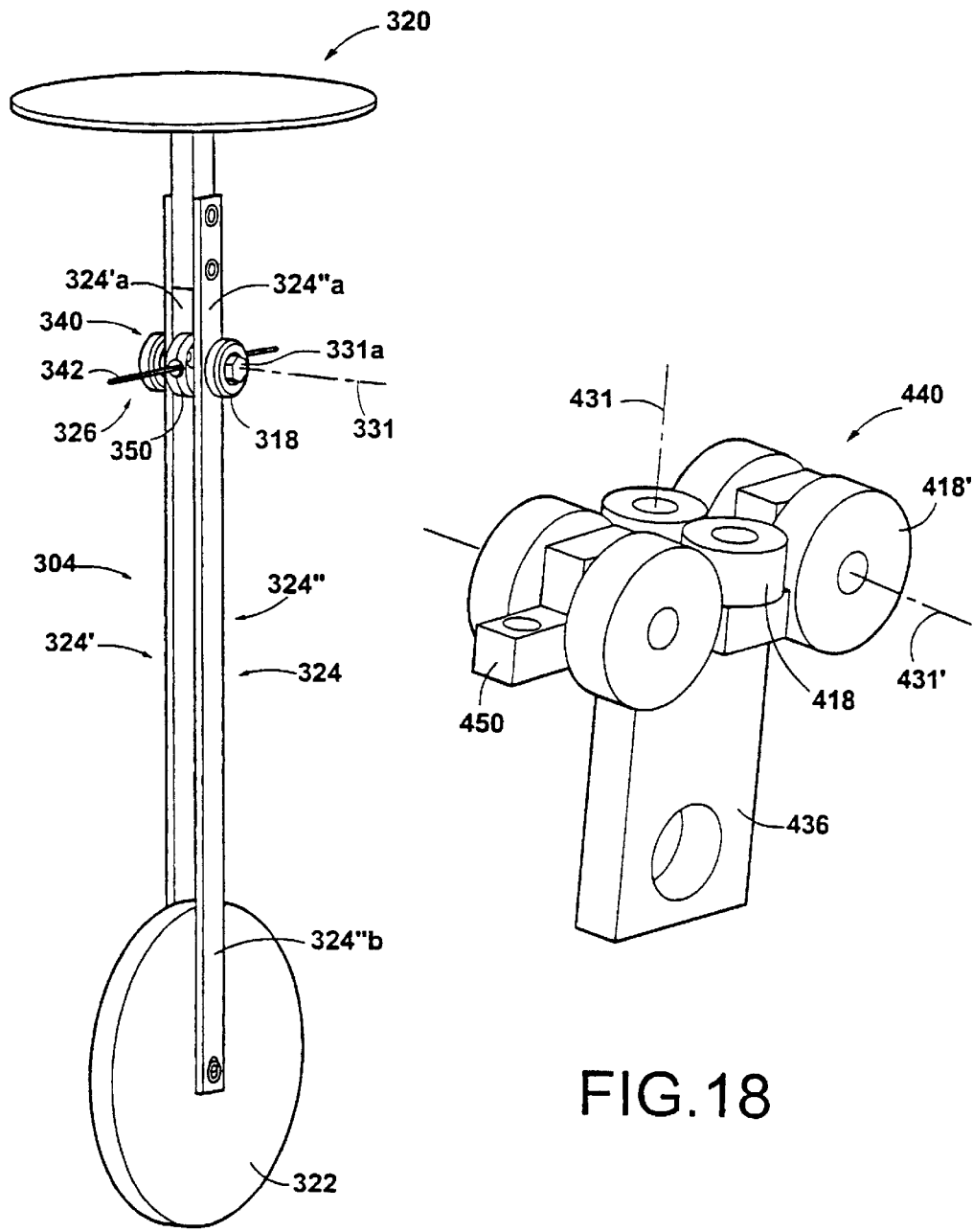

The embodiment of FIG. 17 provides a trolley 304 with an upright 324 comprising two parallel rectilinear arms 324' and 324" fixed by their lower end part (324"b in FIG. 17) at the level of the axis of revolution of a counterweight 322 in the form of a disc. The upper end parts 324'a and 324"a of the two arms are mounted on either side of the base of a support 320 surmounting the chain 326 which comprises a cable 342 fixed at the level of each rolling element 340 of the trolleys 324. These rolling elements 340 comprise a material axial pin 331a which is horizontal and perpendicular to the vertical principal direction of the upright 324 and which traverses the two arms 324' and 324", a connecting piece 350 located between the two arms 324' and 324" and on which the cable 342 is fixed, and two rollers 318 positioned on either side of the upright 324. The rollers 318 ensure, by their rotation about the geometrical axis 331, the rolling of the chain 326 with respect to the guiding rail (not shown).

The solution of FIG. 18 uses rolling elements 440 mounted on each trolley at the level of a connecting lug 436, intended to be inserted in the longitudinal slot 212 of the guiding rail, and surmounted by three pairs of rollers: a central pair of rollers 418, of vertical geometrical axes 431 and adapted to roll on the vertical lateral inner walls of the guiding rail presenting the shape of an upturned U, and two pairs of rollers 418 of horizontal geometrical axes 431' adapted to roll on the upper and lower walls (cf. FIG. 10) of the guiding rail. This rolling element 440 is symmetrical along two vertical planes respectively parallel and orthogonal to the conveying circuit. Each rolling element 440 also comprises a connection assembly 450 on which the rollers 418 and 418' and the connecting lug 436 are mounted. In order to form the chain, the connection assemblies 450 are connected in line with one another by an articulation adapted to follow the curves and upward and downward slopes of the conveying line.

The solution illustrated in FIGS. 19 and 20 comprises a chain 526 adapted to roll in the rail 210, the connecting lug 536 projecting downwardly from the slot 212 of the rail 210. This chain 526 comprises longitudinal connecting elements 542 connecting together two successive rolling elements 540, which are connected to a trolley by the connecting lug 536. The rolling elements 540 and the connecting elements 542 bear rollers of horizontal axis (518) and vertical axis (543) respectively, adapted to roll on the runway formed by the inner walls of the rail 210.

Figure 21:
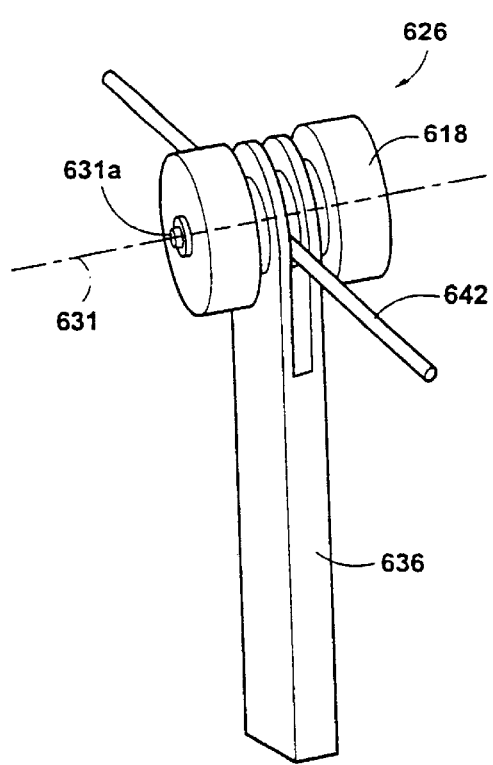

More simply, as may be seen in FIG. 21, the chain 626 may comprise a cable 642 fixed to a material axial pin 631 a traversing, at the level of the split free end of the connecting lug 636, bores of geometrical axis 631, two rollers 618 being mounted to rotate about the material axial pin 631a on either side of the connecting lug 636.

Figure 22:
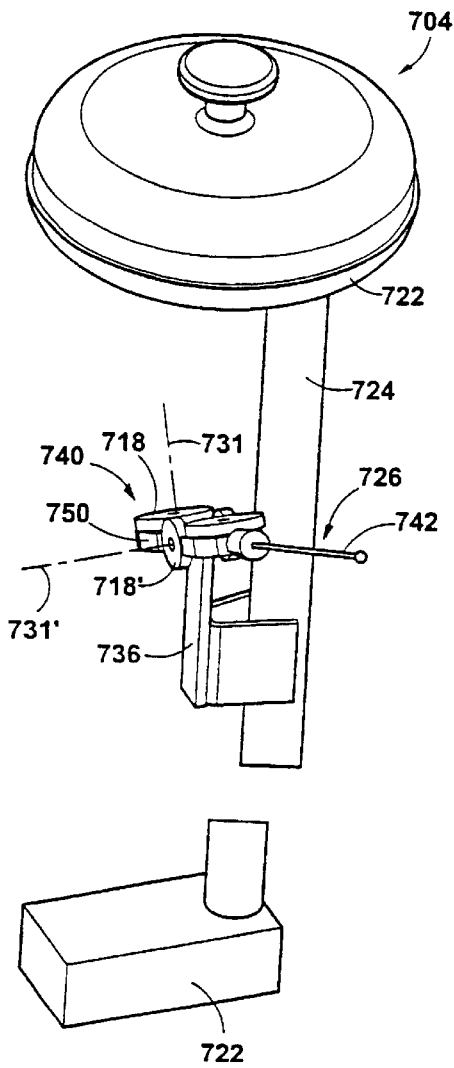

Another form of embodiment as illustrated in FIG. 22 provides a trolley 704 comprising a support 722 at the upper end of an upright 724, of which the lower end is provided with a counterweight 722. A connecting lug 736 fixed on the upright 724 is fastened, at the location of a rolling element 740, on a chain 726 comprising a cable 742 along which the rolling elements 740 are distributed. Each rolling element 740 comprises a connecting piece 750 on which are pivotally mounted, on each side of the connecting lug 736, a pair of rollers 718' of single horizontal geometrical axis 731' and two rollers 718, placed before and after the afore-mentioned pair of rollers 718' along the cable 742, these two rollers 718 each having a vertical geometrical axis of rotation 731.

Figures 23, 24:
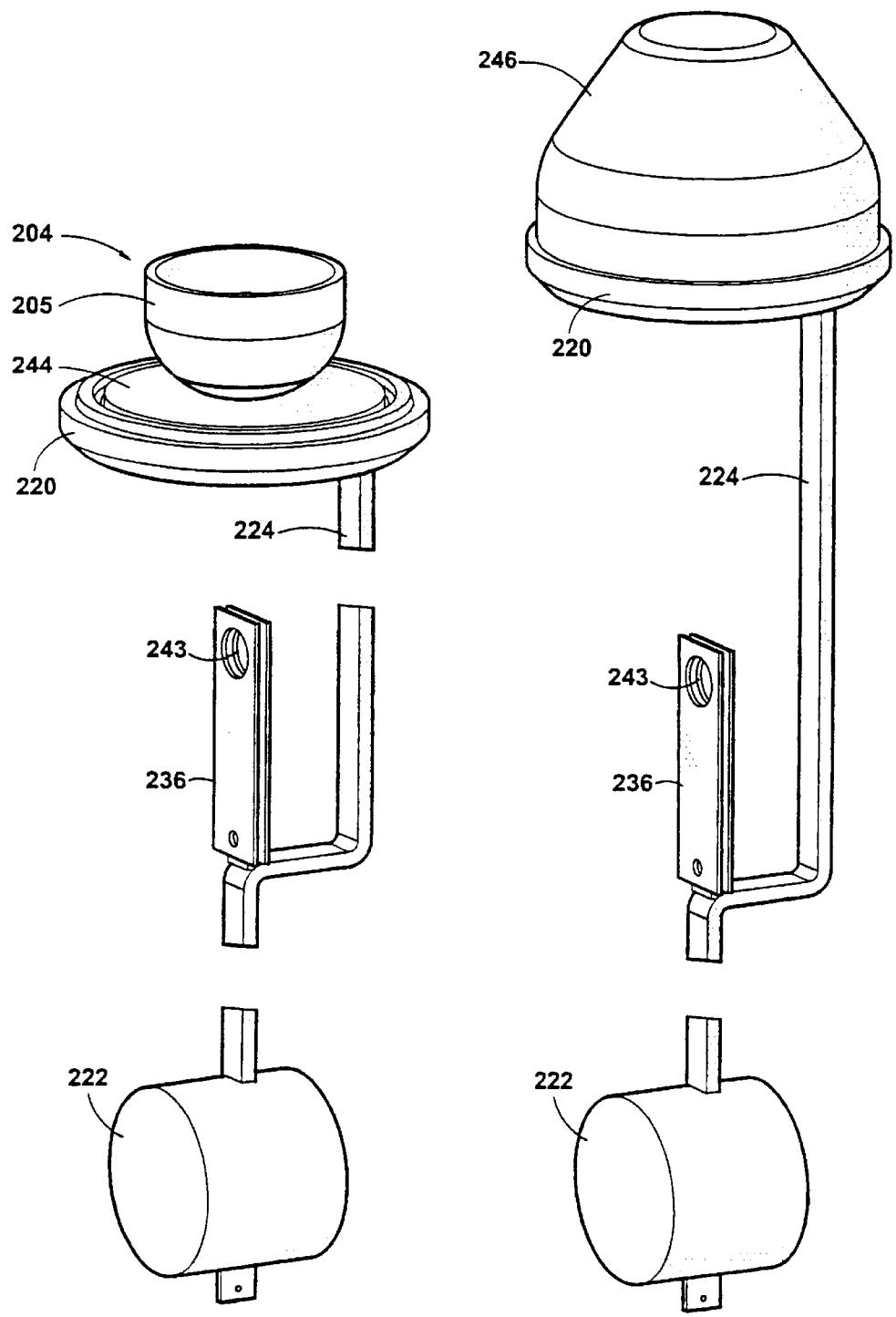
FIG. 23 is a partial, enlarged view in perspective of a transport trolley on which a dish is placed.
FIG. 24 is a view similar to that of FIG. 23 on which the support of the transport trolley is covered by a protecting lid or bell-shaped dish cover.

Reference will now be made to FIG. 23 which illustrates in greater detail a possible form of embodiment of the supports 120 or 220. The support 220 shown in FIG. 23 surmounts a trolley 204 corresponding to the second form of embodiment. This support 220 presents, according to another particularly advantageous characteristic of the present invention, means for maintaining temperature, preferably in the form of at least one heat accumulator 244 previously cooled or heated. These heat accumulators 244 make it possible, by simple contact with a dish 205, to maintain the latter either hot or cold, in order not to denature the quality of tasting of the food contained in this dish 205. In addition, as there is no direct interaction between these heat accumulators and the food, this arrangement enables the standards of hygiene and of security in force to be respected.

In this way, in the kitchen, when the dishes 205 are arranged on a trolley 204, it suffices also to place on this trolley 204 a previously heated or cooled heat accumulator enabling the dish 205 to be respectively maintained hot or cold.

Of course, other solutions for maintaining temperature exist, such as infra-red heating.

In addition, in order to complete maintenance of temperature and to preserve non-contamination of the dishes 205, each of the supports 220 is advantageously provided to be equipped with a removable protection lid or bell-shaped dish cover 246 mounted on said support 220 over a dish 205. This lid 246 preferably presents openings (not shown) avoiding condensation and it is made at least partially of a transparent material in order to guarantee visibility of the dish 205 by the customer, without it being necessary to open it, this view determining the choice of a dish from the different dishes 205 circulating in front of this customer.

In order to guarantee that each of these lids remains associated with the corresponding trolley 204, each lid 246 is preferably connected to said support 220 by removable closure means forming hinges (not shown). In order to allow easy opening of this lid 246, even in the case of the trolley 204 passing between two customers, the lid 246 is advantageously provided to be equipped with two closure means placed substantially diametrally opposite with respect to the direction of the conveying circuit 202.

In addition, for the opening and closure of this lid 246 to be effected easily and reliably, it is preferable to provide retaining means guaranteeing that the lid remains open as soon as it has been at least partially raised, on the one hand, and return means facilitating its closure, on the other hand.

According to the present invention, it is also provided, according to other advantageous characteristics (not illustrated):

that the conveying device further comprises means for measuring the temperature of the dish 205 and/or of the heat accumulator 244 surmounting at least one of the supports 220, these means comprising for example a heat sensor associated with display means for informing in the kitchen, and possibly in the restaurant room, that the temperature of the circulating dishes is correct;

that the conveying device further comprises means for timing the time elapsed since a dish 205 was placed on the support 220, these timing means being able to be triggered off by means for detecting the presence of a dish 205 on the useful face of the support 220. A retractable catch may constitute such detection means connected to a timer and to display means. Such a system ensures the possibility of withdrawing a dish 205 from the conveying circuit 202 when the time elapsed since it was placed in circulation is considered too long.

What is claimed is:

1. Conveying device, in particular for catering, characterized in that it comprises:
 a frame,
 first guiding means mounted on said frame along a conveying circuit,
 several transport trolleys distributed along said conveying circuit, and
 a system for driving each of the transport trolleys comprising second guiding means mounted on each of the transport trolleys and intended to cooperate with said first guiding means in order to guide the movement of said transport trolleys along said conveying circuit, transmission means adapted to be connected to said transport trolleys and powering means actuating said transmission means so as to drive said transport trolleys with respect to said frame by cooperation between said second guiding means and said first guiding means,
 each of said transport trolleys comprising a support having at least one useful face, advantageously intended for supporting at least one dish and means for maintaining said useful face substantially horizontal, which comprises a pivoting connection between said transport trolley and said transmission means.

2. Device according to claim 1, characterized in that the connection between said transmission means and each of the transport trolleys is disconnectable.

3. Device according to claim 1, characterized in that said transmission means comprise a chain connecting said transport trolleys to one another, said powering means actuating said chain with respect to said first guiding means.

4. Device according to claim 3, characterized in that said transport trolleys each comprise an upright which is connected to said chain and in that said support is connected to an upper end part of said upright.

5. Device according to claim 4, characterized in that said means for maintaining said useful face horizontal further comprises a counterweight equipping a lower end part of said upright, and in that said pivoting connection is formed between said upright and said chain.

6. Device according to any claim 3, characterized in that said first guiding means form a runway for said chain, preferable endless, and in that said second guiding means present rolling elements adapted to cooperate with said runway.

7. Device according to claim 4, characterized in that said upright of the transport trolleys presents a vertical principal direction and in that said useful face is at least partially planar and substantially perpendicular to said vertical principal direction.

8. Device according to claim 1, characterized in that at least one support is provided with temperature maintaining means adapted to conserve hot or cold a dish placed on said useful face of the support for a certain duration.

9. Device according to claim 8, characterized in that said temperature maintaining means comprise at least one heat accumulator provided with a surface adapted to be in contact with said dish.

10. Device according to claim 6, characterized in that said upright presents the form of a swans neck and comprises lower and upper end parts substantially parallel and offset by means of a central connecting part, said support, said runway and said counterweight being substantially aligned vertically.

11. Device according to claim 5, characterized in that the horizontal axis of said pivoting connection is perpendicular to the direction of said chain.

12. Device according to claim 6, characterized in that the runway comprises at least one guiding rail presenting horizontal section, possibly placed at different heights and connected together by upwardly/downwardly inclined sections.

13. Device according to claim 12, characterized in that said frame is provided with at least one horizontal plate adapted to constitute a table overhanging, on bordering it, at least one horizontal plate adapted to constitute a table overhanging, one bordering it, at least one portion of one of said horizontal sections at a height such that dish support lies at least at the level of said plate.

14. Device according to claim 13, characterized in that at least a part of the horizontal sections of the guiding rail lies between two plates adapted each to form a table disposed on either side of a portion of the conveying circuit.

15. Device according to claim 6, characterized in that each of said rolling elements of said chain comprises at least one roller, advantageously two rollers with the same geometrical axis of rotation, said rolling elements being adjacent and connected to one another.

16. Device according to claim 15, characterized in that said rolling elements present axes of rotation oriented perpendicularly to the direction of said chain, alternately in a vertical and horizontal direction.

17. Device according to claim 16, characterized in that the guiding rail associated with said chain presents an internal section of substantially square shape of which the side presents a length slightly greater than the diameter of said rollers.

18. Device according to claim 12, characterized in that said uprights are connected to at least one roller of horizontal axis of rotation by means of a connecting lug extending said lower end part of the upright upwardly and penetrating in said slot with the result that the central part and the upper end part of the upright go around said guiding rail.

19. Device according to claim 18, characterized in that said uprights are connected to at least one roller of horizontal axis of rotation by means of a connecting lug extending said lower end part of the upright upwardly and penetrating in said slot with the result that the central part and the upper end part of the upright go around said guiding rail.

20. Device according to claim 19, characterized in that the geometrical axis of the pivoting connection and the vertical line passing through the centre of gravity of the trolley converge at a point forming the point of fastening of said trolley on the chain.

21. Device according to claim 3, characterized in that said chain is constituted by flexible belts connected together by connection means provided with at least one roller of horizontal axis perpendicular to said vertical principal direction of the upright associated with said connection means, said roller being adapted to roll in a guiding rail open on the side forming said runway and in that said horizontal material axis of the roller is connected to said upright in order to form said pivoting connection.

22. Device according to claim 21, characterized in that said connection means comprise two rollers mounted on either side of said upright and in that said guiding means comprise two guiding rails open on the opposite each other, said runway being constituted, respectively for each roller by a longitudinal zone of the inner surface of one, and of the other respectively, of said guiding rails.

23. Device according to claim 5, characterized in that said trolleys are connected, at the level of said counterweights, by one of a cable, a belt and a cord.

24. Device according to claim 9, characterized in that it further comprises means for measuring the temperature of one of the dish and the accumulator surmounting at least one of said supports.

25. Device according to claim 24, characterized in that said means comprise a heat sensor associated with display means.

26. Device according to claim 1, characterized in that it further comprises means for timing the time elapsed since a dish was placed on said support.

27. Device according to claim 26, characterized in that said timing means are triggered off by means for detecting the presence of a dish on the useful face of the support.

28. Device according to any claim 1, characterized in that said trolleys further comprise a removable protection lid mounted on said support.

29. Device according to claim 28, characterized in that said lid presents openings and is made at least partially of a transparent material.

30. Device according to claim 28, characterized in that said lid is connected to said support by removable closure means forming hinges, placed substantially diametrally opposite with respect to the direction of the conveying circuit.

31. Device according to claim 4, characterized in that said means for maintaining said useful face substantially horizontal further comprises an additional guiding rail parallel to said guiding rail in an identical path and at least one element equipping the lower part of said upright and which is intended to move along said additional guiding rail by one of a rolling and sliding motion.

* * * * *